No. 836,334. PATENTED NOV. 20, 1906.
I. NEWMAN.
BED PAN.
APPLICATION FILED AUG. 25, 1905.
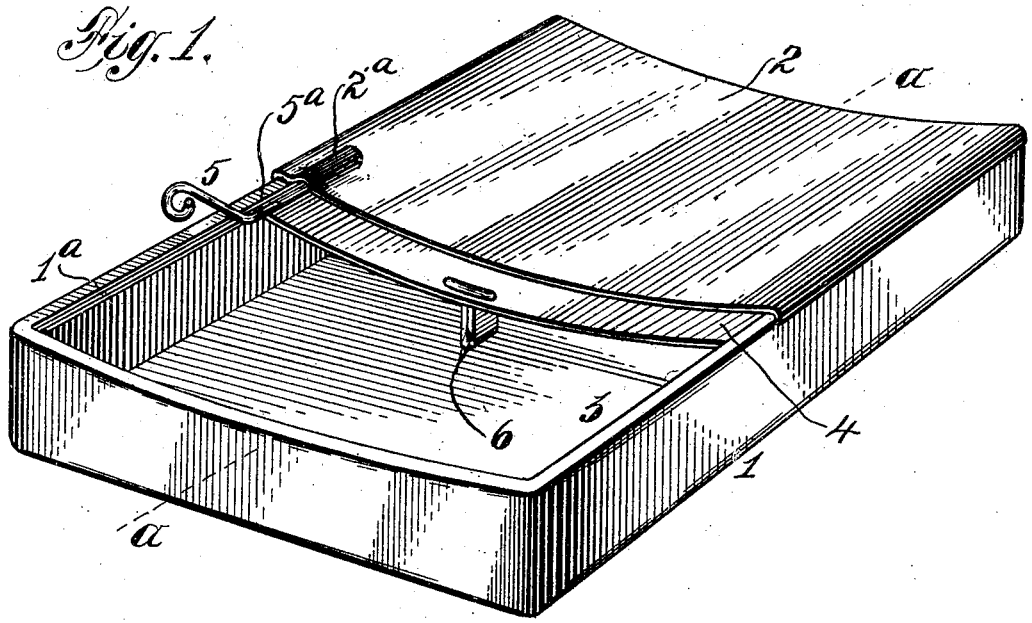
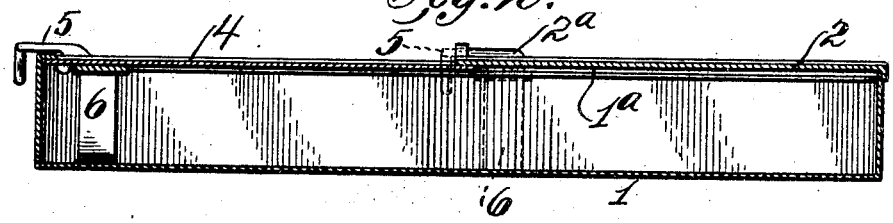

UNITED STATES PATENT OFFICE.

ISIDORE NEWMAN, OF NEW YORK, N. Y.

BED-PAN.

No. 836,334.  Specification of Letters Patent.  Patented Nov. 20, 1906.

Application filed August 25, 1905. Serial No. 275,750.

*To all whom it may concern:*

Be it known that I, ISIDORE NEWMAN, a citizen of the United States, residing in New York city, borough of Manhattan, New York, have invented certain new and useful Improvements in Bed-Pans, of which the following is a specification.

The object of my invention is to provide a bed-pan which will be comfortable in use, may be readily covered to retain the contents and odor, and wherein a relatively thin cover may support the weight of the patient in the different positions of adjustment of the cover.

In carrying out my invention I provide a suitably-shaped pan or receptacle, having its top portion partially closed and a cover fitted to slide over the open part of the pan and beneath the permanent cover portion, by preference the cover portions of the pan being concave on their upper surfaces for convenient reception of a person's body thereon.

Reference is to be had to the accompanying drawings, forming part hereof, wherein—

Figure 1 is a perspective view of a bed-pan embodying my invention, and Fig. 2 is a section thereof substantially on the line *a a* in Fig. 1.

In the drawings the numeral 1 indicates, generally, a pan or receptacle, which may be of suitable shape and dimensions and made of suitable material, and on its upper side said pan is partially closed by a non-adjustable or substantially permanent cover portion 2, providing an open portion 3 to receive excretions, &c., and at 4 is a cover adapted to close the opening 3 and arranged to slide under the cover portion 2. As shown, the pan 1 has opposed grooves, as at 1ª, in the side walls, receiving the corresponding edges of cover 4, whereby the latter is mounted to slide along the pan beneath the cover portion 2. The cover 4 is shown provided with a handle 5, projecting over a side wall of the pan and shown bent down at one side of the pan, outside thereof, in convenient position for manipulation without interfering with the patient. The handle 5 is shown in the form of a suitably-bent wire attached to the upper surface of cover 4, so as to pass over the edge of the pan, the attaching portion 5ª of the handle being adapted to slide under a bent-up or socket portion 2ª of the cover portion 2 of the pan. The cover 4 on its under surface is shown provided with a depending projection 6, adapted to bear against the bottom of pan 1, so as to transfer part of the weight of the patient upon the pan to the bottom of the pan, the cover portion 2 being thus centrally supported by the projection 6, when the cover 4 is slid back beneath the cover portion 2, as in dotted lines in Fig. 2. By this means the cover portion 2 and the cover 4 may be made of relatively thin metal, while being rendered sufficiently strong by having the covers one upon the other when the pan is open for use and by reason of the projection 6.

As shown in Fig. 1, the cover portion 2 and the sliding cover 4 are made concavo-convex, so that their upper surfaces are concave for receiving a patient thereon in a convenient position and with ease, the upper surface of cover 4 thereby corresponding to the under surface of portion 2, so as to readily slide thereunder. Pans constructed as above set forth may be made relatively shallow compared with length and width, so that the patient need not be raised very much from the bed while upon the pan.

In using the pan it may easily be placed under the patient, who can rest upon the concave cover portion 2 in convenient position to evacuate through the opening 3, the cover being readily slid back beneath the patient, and after use the cover 4 can be slid forward over the opening 3 by the patient or an attendant without moving the patient, so as to completely close the contents of the pan from sight and prevent the emission of odor.

Having now described my invention, what I claim is—

1. A bed-pan having a normally closed upper portion and an adjacent opening, and a cover for said opening fitted to slide beneath the cover portion, substantially as described.

2. A bed-pan having a normally closed upper portion and an adjacent opening, and a cover for said opening fitted to slide beneath the cover portion, said cover having a projection adapted to bear upon the bottom of the pan, substantially as described.

3. A bed-pan having a normally closed upper portion and an adjacent opening and provided with grooves in its walls, and a cover fitted in said grooves to slide under the normally closed portion, substantially as described.

4. A bed-pan having a normally closed upper portion and an adjacent opening, and a cover for said opening fitted to slide beneath the cover portion, the sliding cover having a handle projecting over a side wall of the pan, substantially as described.

5. A bed-pan having a normally closed upper portion and an adjacent opening, and a cover for said opening fitted to slide beneath the cover portion, the upper surfaces of the cover portion and the sliding cover being concave on their upper surfaces, substantially as described.

6. A bed-pan having a concavo-convex cover portion and an adjacent opening, and a concavo-convex cover fitted to slide beneath the cover portion, the concave upper surface of the sliding cover registering with the convex under surface of the cover portion, substantially as described.

ISIDORE NEWMAN.

Witnesses:
T. F. BOURNE,
MAURICE BLOCK.